United States Patent
Marshall

(10) Patent No.: US 10,132,062 B2
(45) Date of Patent: Nov. 20, 2018

(54) ASSEMBLY UNIT FOR A CONCEALED PLUMBING FIXTURE

(71) Applicant: Christopher Marshall, Stuttgart (DE)

(72) Inventor: Christopher Marshall, Stuttgart (DE)

( * ) Notice: Subject to any disclaimer, the term of this patent is extended or adjusted under 35 U.S.C. 154(b) by 0 days.

(21) Appl. No.: 14/976,857

(22) Filed: Dec. 21, 2015

(65) Prior Publication Data

US 2016/0177548 A1 Jun. 23, 2016

(30) Foreign Application Priority Data

Dec. 23, 2014 (DE) .................... 10 2014 119 595
Apr. 17, 2015 (DE) .................... 20 2015 002 927 U

(51) Int. Cl.
| | | |
|---|---|---|
| *F16L 3/01* | (2006.01) | |
| *E03C 1/02* | (2006.01) | |
| *F16M 13/02* | (2006.01) | |
| *F16L 3/08* | (2006.01) | |
| *F16B 5/02* | (2006.01) | |
| *F16L 3/10* | (2006.01) | |

(52) U.S. Cl.
CPC ............ *E03C 1/021* (2013.01); *F16M 13/02* (2013.01); *F16B 5/0225* (2013.01); *F16B 5/0233* (2013.01); *F16L 3/01* (2013.01); *F16L 3/08* (2013.01); *F16L 3/1016* (2013.01)

(58) Field of Classification Search
USPC ..... 248/56, 57, 65, 73, 200, 346.01, 346.03, 248/346.5; 285/61, 64, 405, 410, 413, 285/406, 62, 63
See application file for complete search history.

(56) References Cited

U.S. PATENT DOCUMENTS

| | | | | |
|---|---|---|---|---|
| 1,909,136 | A * | 5/1933 | Thomas, Jr. ............ | H02G 3/20 174/50 |
| 2,586,001 | A * | 2/1952 | Carpenter ............... | F16L 3/227 248/68.1 |
| 3,404,858 | A * | 10/1968 | Levy ...................... | F16L 3/227 248/230.9 |
| 3,606,217 | A * | 9/1971 | Leiferman ............. | E03C 1/042 248/57 |
| 4,013,253 | A * | 3/1977 | Perrault ............... | A47B 96/061 248/222.51 |
| 4,141,524 | A * | 2/1979 | Corvese, Jr. ......... | A61G 7/0503 128/DIG. 26 |
| 4,993,670 | A * | 2/1991 | Tesar .................... | F16L 3/1091 248/68.1 |
| 6,678,139 | B1 * | 1/2004 | Greuter ................. | H02G 15/06 361/117 |
| 2004/0065154 | A1 * | 4/2004 | Kibblewhite .......... | F16B 31/02 73/761 |

(Continued)

FOREIGN PATENT DOCUMENTS

AT   374222      1/1981
DE   4433354 A1  3/1996

(Continued)

*Primary Examiner* — Alfred J Wujciak
(74) *Attorney, Agent, or Firm* — Shlesinger Arkwright & Garvey LLP

(57) ABSTRACT

Assembly unit for a concealed plumbing fixture with at least one fastening element for fastening to an unfinished wall and an assembly plate configured to be adjustably and fixably attached to the at least one fastening element.

13 Claims, 6 Drawing Sheets

(56) References Cited

U.S. PATENT DOCUMENTS

| | | | |
|---|---|---|---|
| 2005/0218270 A1* | 10/2005 | Doverspike | F16L 1/10 |
| | | | 248/65 |
| 2005/0224653 A1* | 10/2005 | Miener | H01R 4/646 |
| | | | 244/129.1 |
| 2012/0297723 A1* | 11/2012 | Siddiqui | F16L 3/24 |
| | | | 52/698 |
| 2014/0097304 A1* | 4/2014 | Mastro | F16L 3/24 |
| | | | 248/73 |

FOREIGN PATENT DOCUMENTS

| | | |
|---|---|---|
| DE | 10 2008 064 253 B3 | 2/2010 |
| DE | 10 2011 051 739 A1 | 1/2013 |
| JP | 02062492 A * | 3/1990 |

\* cited by examiner

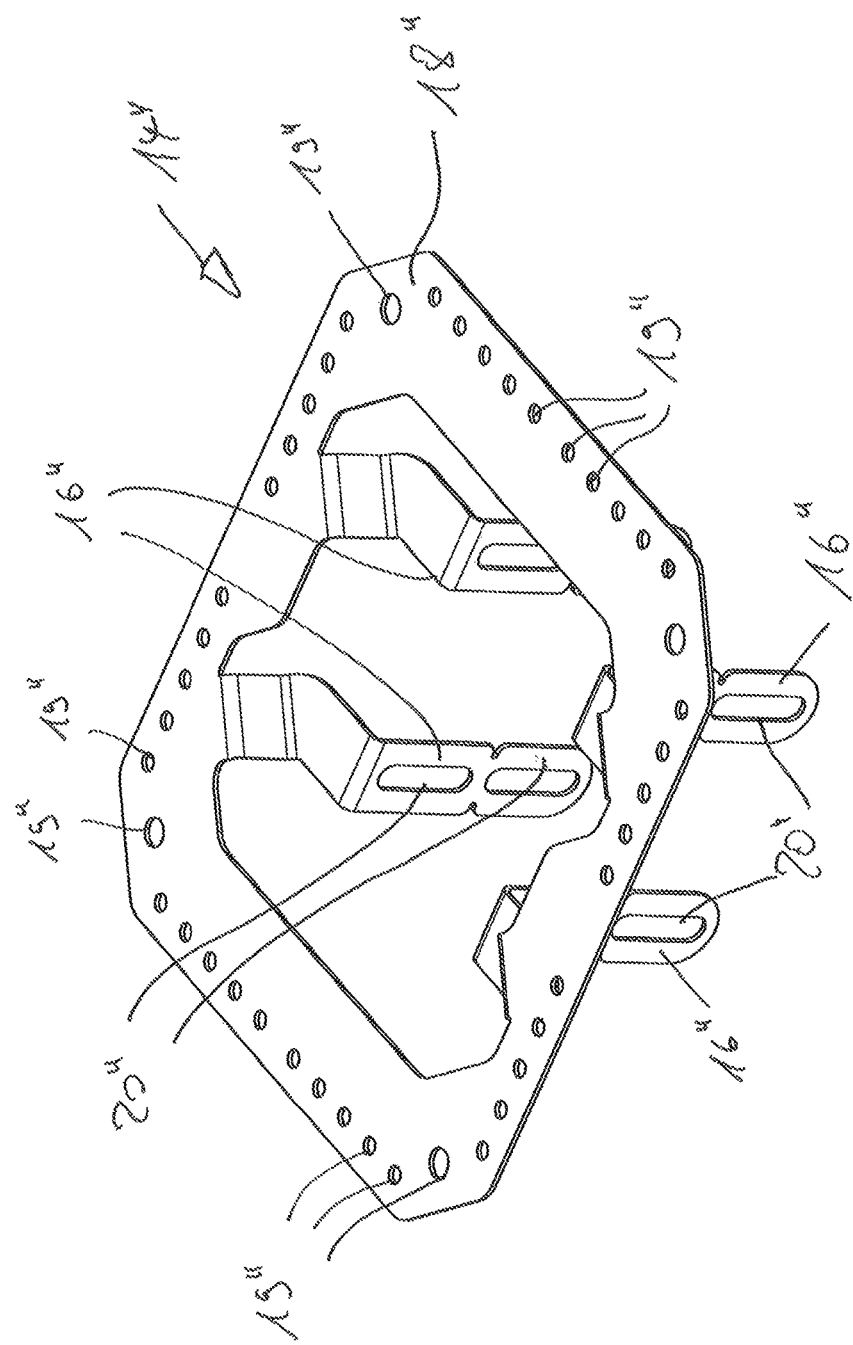

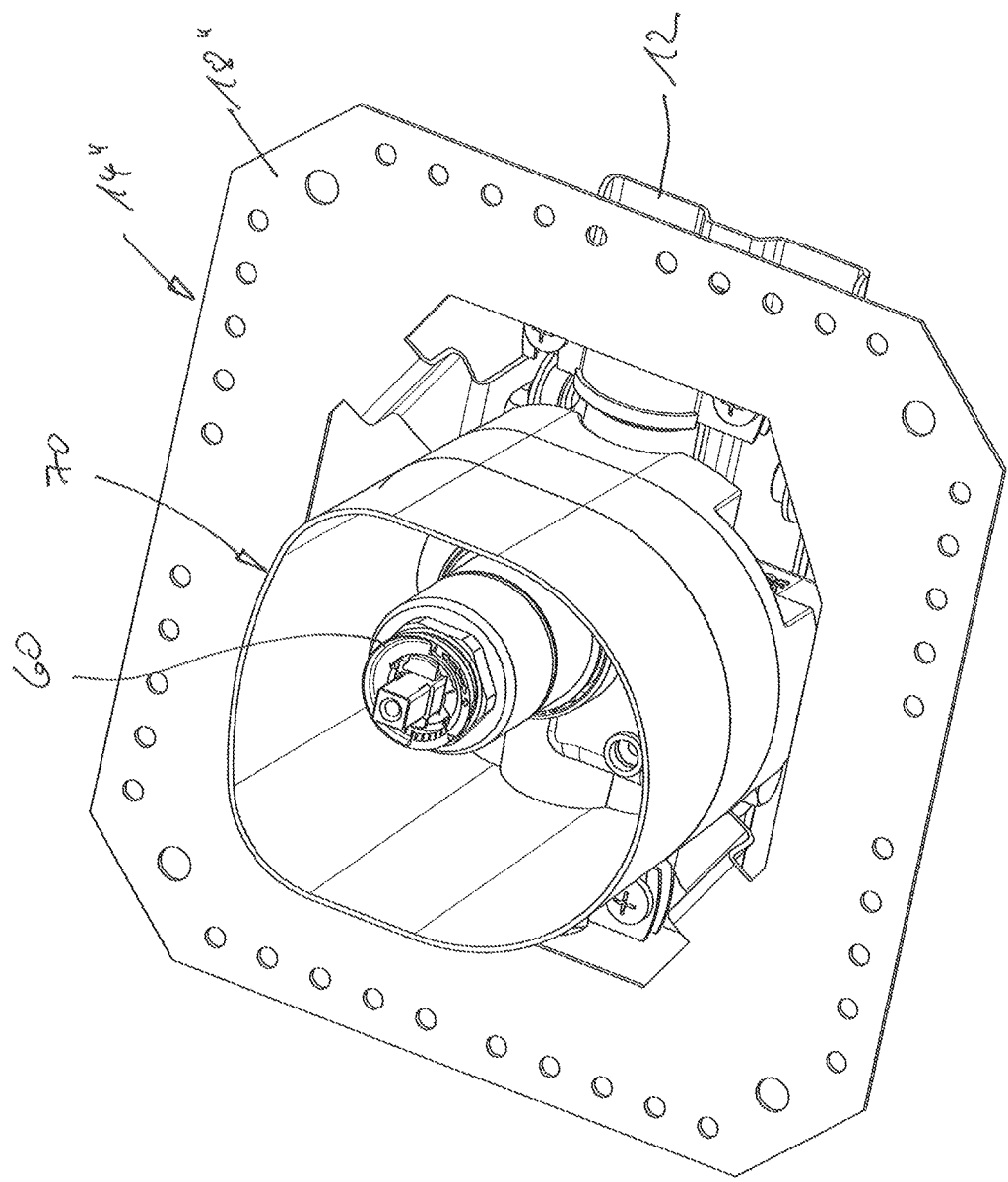

ASSEMBLY UNIT FOR A CONCEALED PLUMBING FIXTURE

TECHNICAL FIELD

The present invention relates to an assembly unit for a concealed plumbing fixture.

DESCRIPTION OF THE STATE OF THE ART

Assembly units for concealed plumbing fixtures are known.

For instance, DE 20 2004 040 084 A1 discloses a concealed plumbing fixture with a connection body and a fastening element for fastening the connection body into an installation opening, wherein the connection body has an adjustable fastening device with which it can be fastened within the installation opening at various installation depths. The adjustable fastening device comprises at least one fastening ring that is adjustable in an axial direction along the connection body and at least one locking means to lock the fastening ring to the connection body.

DE 10 2011 051 739 A1 discloses an assembly unit for a concealed plumbing fixture which comprises a connection body to be fastened to a fastening device. The fastening device has a base element whose bottom side can be fitted on and thus connected to a horizontal and/or vertical mounting plane. A height leveling element in the form of a set screw is screwed into the base element.

SUMMARY OF THE INVENTION

In contrast thereto, the invention proposes an assembly unit for a concealed plumbing fixture having the features as disclosed herein.

The concept of the invention is to achieve the simplest possible design of a generic assembly unit and to make said assembly unit as simple as possible to handle by equipping it with at least one fastening element for fastening to an unfinished wall (i.e. shell construction wall) or mounting plane, and by equipping the at least one fastening element with an adjustable mounting plate that can be locked in position.

The mounting plate (on or to which a connection body of the plumbing fixture is attached) is thus not itself directly fastened to the unfinished wall or mounting plane, but this is rather accomplished by way of fastening elements arranged on the mounting plate, which fastening elements are connected to the mounting plate so as to enable relative movement of the mounting plate with respect to the fastening elements substantially perpendicularly with respect to the unfinished wall or mounting plane with the fastening elements being fastened to the unfinished wall.

The design of an assembly unit for a concealed plumbing fixture according to the invention provides for a simple yet precise height adjustment for positioning the connection body that is attached to the assembly unit with regard to the fully tiled wall structure. The assembly unit according to the invention is therefore especially suited to be used for installation in existing buildings or for renovation of old buildings or for other modernization measures.

Further advantages and embodiments of the invention become apparent from the description and the attached drawings.

It is evident that the features mentioned above and those yet to be explained below may be applied not only in the respective combination indicated, but also in other combinations or individually, without going beyond the scope of the present invention.

The invention is schematically illustrated in the attached drawings by means of exemplary embodiments, and it will be described in detail below, with reference to the drawings.

BRIEF DESCRIPTION OF THE DRAWINGS

FIG. 5 shows yet another version of a fastening element.

FIG. 6 shows an assembly unit according to the invention with a fastening element of FIG. 5.

DETAILED DESCRIPTION

Figure 1:
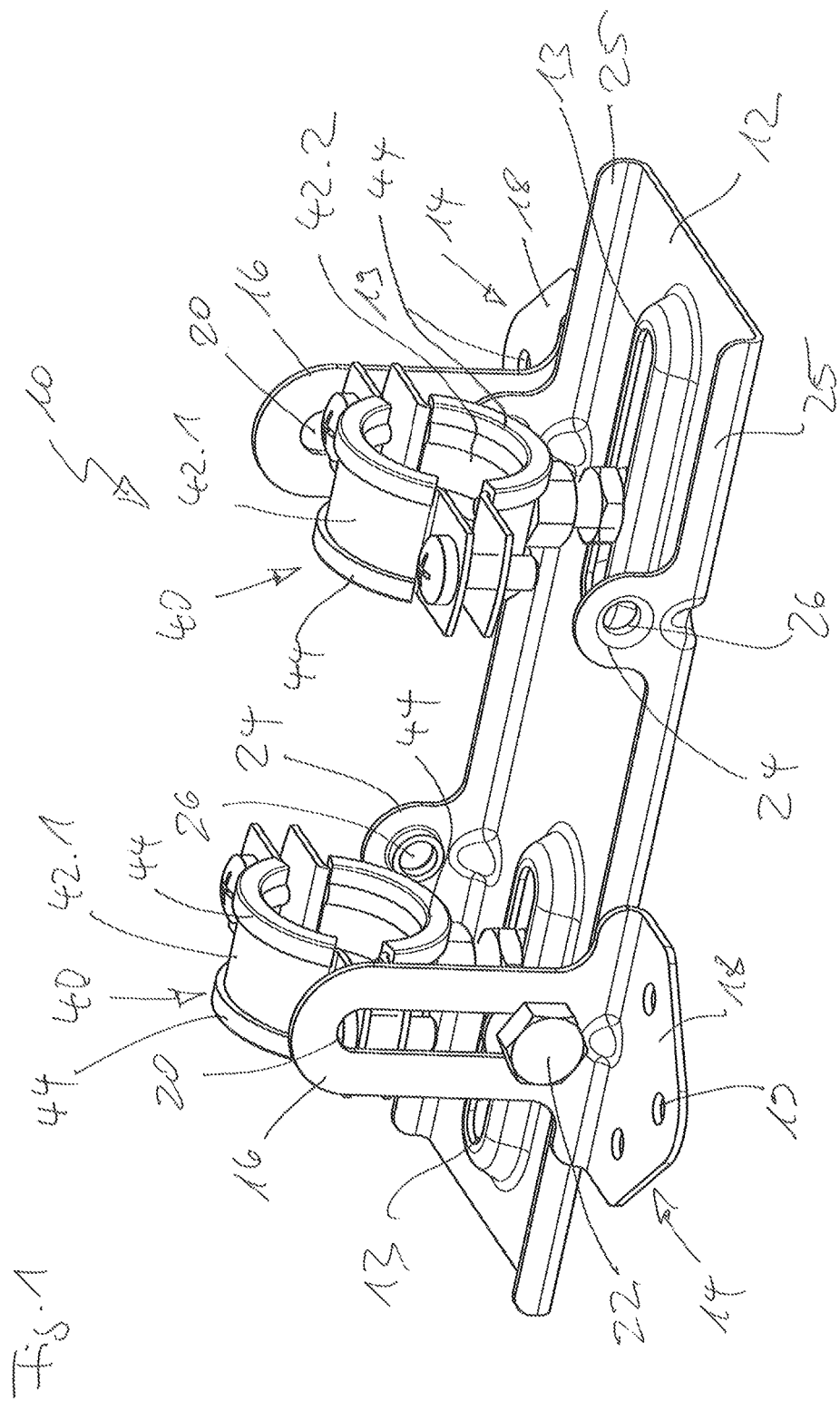
FIG. 1 shows a perspective view of an embodiment of an assembly unit for a concealed plumbing fixture according to the invention.

FIG. 1 shows an assembly unit 10 for a concealed plumbing fixture according to the invention.

Figure 2:
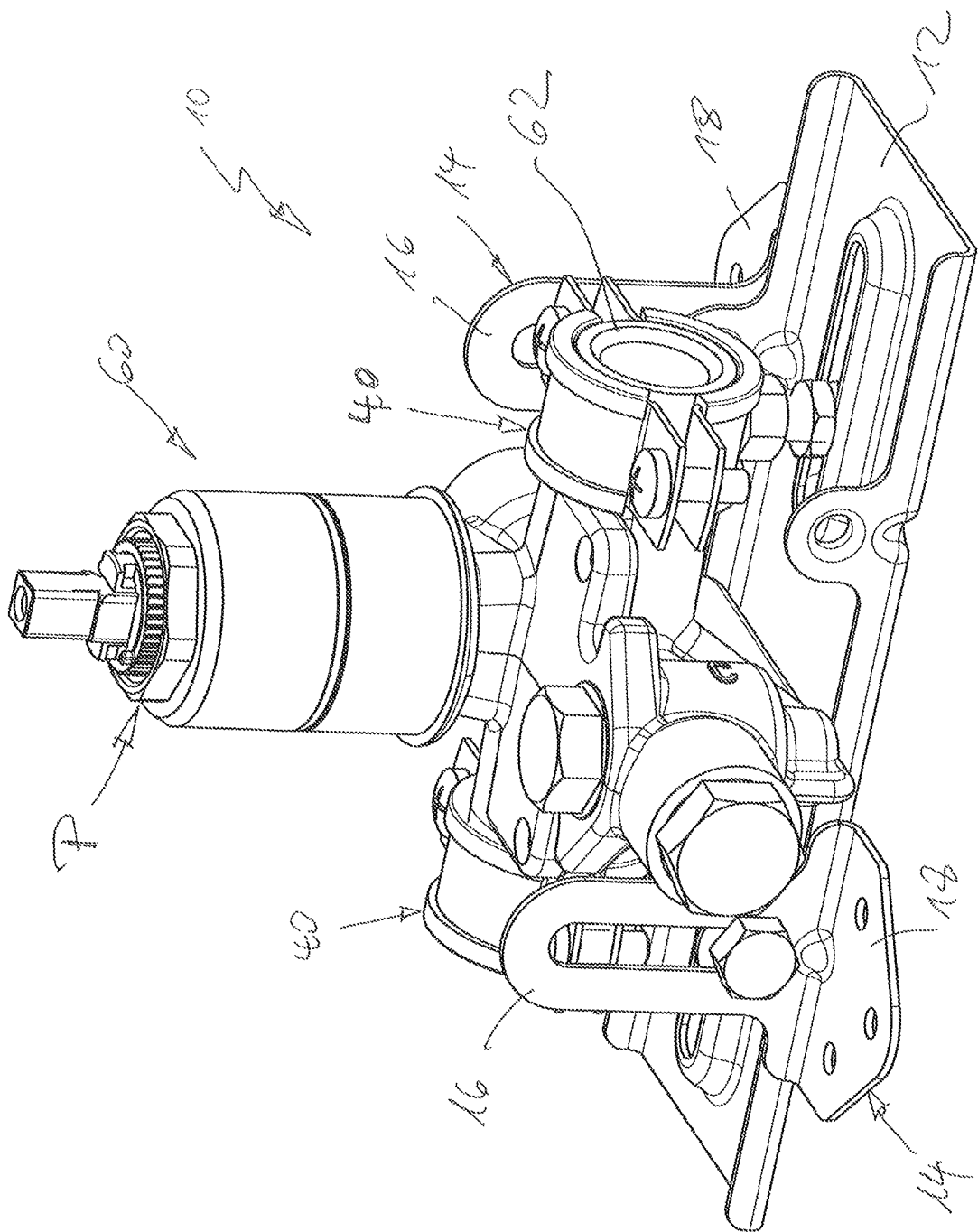
FIG. 2 shows the assembly unit of FIG. 1 with a fixture/fittings connection body attached to it.

The assembly unit 10 comprises a longitudinal and flat mounting plate 12. Connection devices 40 are provided on the mounting plate 12 for attaching a connection body 60 of the plumbing fixture or sanitary fitting (cf. FIG. 2). Each connection device 40 essentially consists of two clamp halves or pipe clamp halves 42.1, 42.2 into which, in a known manner, connecting pieces 62 of the connection body 60 are inserted and securely clamped by means of screws, as illustrated in the example of FIG. 2, in order to connect to the building's hot and/or cold water lines (not shown). The pipe clamp halves 42.1, 42.2 can, for example, be two-screw clamps with safety-type quick-release fasteners. The clamps can be manufactured from electrogalvanized steel, for example.

The connection device 40 can have acoustic decoupling means in order to prevent sound transmission between the fixture/fitting and the building's water supply system. In the exemplary embodiment shown, the acoustic decoupling means can, for example, be rubber or plastic inserts 44 inserted into the pipe clamp halves 42.1, 42.2. For instance, they can be made of an elastomer such as ethylene propylene diene monomer (EPDM) rubber, which has excellent durability.

To enable or simplify use of the mounting plate for different connection bodies, the connection devices 40 are arranged along respective longitudinal slots 13 formed in the longitudinal extension of the mounting plate 12 in an adjustable and fixable manner. Thus, each connection device 40 is independently adjustable along a longitudinal extension of the mounting plate and can be fixed in place at the desired position. In the embodiment shown, it is additionally conceivable for the connection device 40 to be rotated about its connection axis which is oriented essentially perpendicular to the mounting plate, if need be.

To achieve the adjustability of the mounting plate 12 according to the invention, the mounting plate 12 further has two fastening elements 14 which are adjustable or slidable perpendicular to an extension plane of the mounting plate 12 and can be fixed in place at a desired position.

In the embodiment shown, each fastening element 14 has a first section 16 which enables the fastening element 14 to be adjustable and fixed in place to the mounting plate 12. Furthermore, each fastening element 14 has a second section 18 with which the fastening element 14 is fastened to an unfinished wall or mounting plane (not shown). The first section 16 and the second section 18 are designed to be essentially perpendicular to one another. The two sections 16, 18 thus form an angular element. Each fastening element 14 thus has an essentially L-shaped cross-section.

The first section 16 is elongated in shape and has a slot 20. The connection between the first section 16 and the mounting plate is implemented by means of a connection element 22 that passes through the slot 20. The connection element 22 is, for example, a thread screw with a hexagonal head. The connection element 22 engages with a receiving element 24 provided for this purpose on the mounting plate 12.

In the embodiment shown, the receiving element 24 is arranged on a raised section 25 running along a longitudinal edge of the mounting plate 12. The raised edge 25 is oriented essentially perpendicular to the mounting plate 12. The receiving element 24 is formed by a widening of the raised edge 25 and has a threaded receiving hole 26 for engaging with the described connection element 22.

In the exemplary embodiment shown, the mounting plate comprises a total of four receiving elements 24 distributed symmetrically, two each along both longitudinal edges. In principle, designs with more or fewer receiving elements are also possible.

The first section 16 of each fastening element 14 thus allows the latter to be adjusted by sliding it along the connection element 22 and via the slot 20 in a direction that is essentially perpendicular to an extension plane of the mounting plate 12 (and therefore also essentially perpendicular to the mounting plane) and to be fixed in place at the desired position by tightening the connection element 22.

The second section 18 of the fastening element 14 has one or more (three, in the exemplary embodiment shown) holes or through-holes 19 that serve to fasten the fastening element 14 onto the mounting plane (e.g. unfinished wall or shell construction wall).

To attach the mounting plate 12, the latter, along with the fastening elements 14 attached to it, is fastened to the mounting plane by, for example, screwing tight the respective second section 18 of each fastening element 14. The connection devices 40 are oriented as desired and it may be possible already at this point to perform a rough preliminary adjustment of the distance between the mounting plate and the unfinished wall by loosening the connection elements 22 and sliding the mounting plate along the fastening element 14 fastened to the unfinished wall. The mounting plate 12 is then fixed in the desired position by tightening the connection element 22. Preferably, in this stage of the assembly, the connection body 60 is mounted, as described, on the connection devices 40 and connected to the water lines.

Next, the unfinished wall is plastered, i.e. the pipe connections and the area surrounding the assembly plate are plastered such that ultimately a wall opening is created that is large enough for an attachment element to be placed onto the connection body 60, including the cover plate (rosette), etc. once the wall has been fully tiled. Furthermore, the wall opening is large enough that access still exists to the fastening elements 14, in particular, to the connection elements 22, in order still to perform a fine adjustment even once the wall has been fully tiled (provided the size of the various parts used permits this), whereby the section of the connection body 60 upon which the rosette and attachment element/mixer arm are subsequently placed is arranged flush to the surface of the tiled wall. In FIG. 2, this plane is marked with an arrow P. The described plastering can also be performed where drywall is used, and the drywall sheet used has a corresponding opening of suitable size to enable access to the connection body 60. This opening can be cut out before the wall is put in place, for example, by using a box template according to the invention, which will be described below.

After fine adjustment has been carried out, the connection elements 22 are permanently tightened and installation can be finished by completing the plumbing fixture.

Independent adjustment of the two or more fastening elements enables both height adjustment as well as compensation for any unevenness if the surface of the unfinished wall and the tiled surface are not exactly parallel to one another. The sound damping insert 44 described previously can be used to additionally implement DIN-compliant (i.e. standard-compliant) acoustic decoupling of the connection body 60 from the assembly plate 12.

By forming the connection devices 40 from metal, especially steel or electrogalvanized steel, the assembly unit according to the invention also meets technical fire protection provisions since the mounting of the connection body is therefore fireproof, and the valve body is prevented from falling down or out of the assembly unit, even if plastic parts (sound damping inserts, pipe connectors) melt, at least for as long as the wall into which the assembly unit is installed remains intact. This thus prevents injury of responding firefighters due to falling heavy valve bodies.

Figure 3:
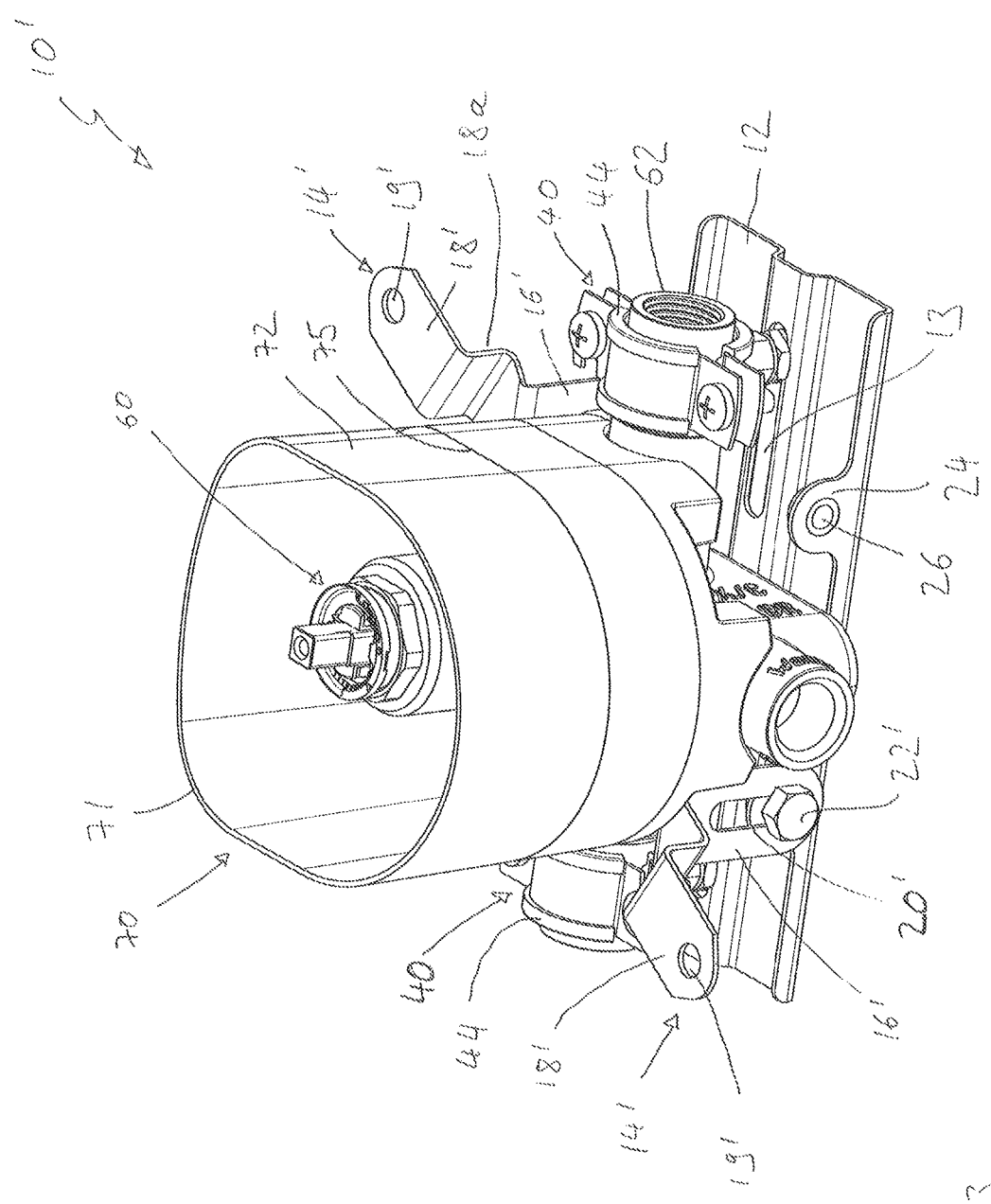
FIG. 3 shows a perspective view of another embodiment of an assembly unit according to the invention with an alternative design of the fastening elements and with a box template according to the invention.

FIG. 3 shows another embodiment of an assembly unit 10' according to the invention with an alternative design of the fastening elements and with a box template according to the invention. The basic structure of the assembly unit 10' in FIG. 3 is identical to that of the assembly unit shown in FIGS. 1 and 2, except for the alternative design of the fastening elements and the presence of a box template. Of course, the latter can also be combined with the versions in FIGS. 1 and 2.

The assembly unit 10' comprises—as do the versions shown in FIGS. 1 and 2—an assembly plate 12 on which connection devices 40 for connecting a connection body 60 are arranged so as to be adjustably fixable in place.

The assembly unit 10' additionally comprises fastening elements 14' (two fastening elements 14', in the exemplary embodiment shown) for fastening the assembly unit 10' to an unfinished wall. Each fastening element 14' has a first section 16' and a second section 18'. By means of the first section 16' the fastening element 14' is adjustably and fixably connected to the assembly plate 12 as described previously (using a slot 20'). The second section 18' allows the fastening element 14' to be fastened to a wall surface acting as a mounting plane by means of a hole 19'.

In contrast to the exemplary embodiment of FIGS. 1 and 2, the two sections 16', 18' of the fastening element 14' are "reversed," i.e. while section 18 of the fastening element 14 from the first exemplary embodiment is designed for fastening to an unfinished wall below the assembly plate, the section 18' of the fastening element 14' from the second exemplary embodiment is designed for fastening to a wall surface acting as an assembly plane above the assembly plate 12 which is sunk into a recess in the wall surface.

Figure 4:
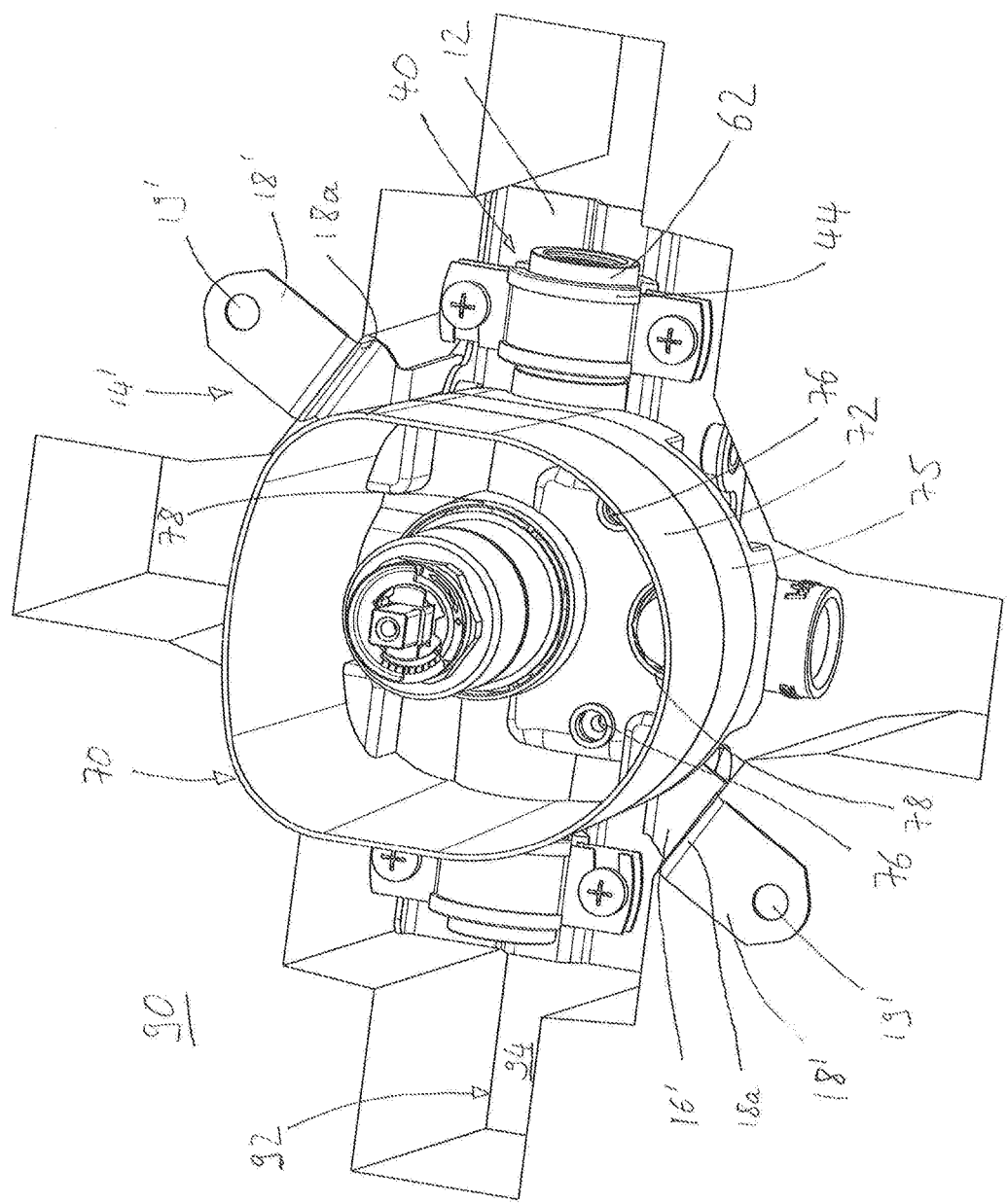
FIG. 4 shows the assembly unit of FIG. 3 as inserted into a masonry wall opening.

Assembly in this manner is illustrated in FIG. 4, in which a wall surface 90 of a masonry wall is shown. A recess 92 is provided in the wall surface, for example by chiseling out existing masonry during renovation work. The assembly plate 12 is inserted as shown into this recess 92, in which pipe connections of an existing pipe system terminate (not shown). The upper sections 18', which extend in a plane that is essentially perpendicular to the plane of the lower sections 16' of the fastening elements 14' come to rest against the wall surface 90 and are fixed there by means of screws/dowels (not shown) inserted through the holes 19'. Of course, more holes can be provided in the sections 18', similar to as in the first exemplary embodiment. The height adjustment of the assembly plate relative to the masonry wall is performed before insertion by sliding the plate along the slots 20' and fixing it in place using screws 22', analogously to the description given above in connection with FIGS. 1 and 2.

As is evident from the illustrations of FIGS. 3 and 4, the respective directions of extension of the two sections 16' and 18' proceed at an angle to one another, although the planes of the directions of extension are substantially perpendicular to one another. This enables the assembly unit to be fixed in place even if the sides of the wall recess 92 are not straight, as is evident from the illustration in FIG. 4. To achieve better stability, the two sections 16' and 18' are angled toward one another in a stepped configuration so as to form an intermediate section 18a with which the fastening element 14' comes to rest against the sides of the recess 92 when the assembly unit is inserted. Since the assembly unit is mounted on the wall surface 90 and the assembly plate 12 must therefore not necessarily be in (planar) contact with a bottom surface 94 of the recess, any unevenness in the bottom surface 94 of the recess is de facto compensated for.

The illustration of the embodiment in FIGS. 3 and 4 also shows a box template 70 according to the invention. In the embodiment shown, the box template 70 is substantially box-shaped with rounded corners, however other shapes are also possible. The shape of the box template is based on the connection body 60 that is being used. The box template comprises a circumferential template wall 72, which interiorly surrounds the connection body 60 mounted on the assembly unit. The height of the template wall 72 is selected such that the box template 70 extends beyond the connection body 60, thereby protecting it during transport.

The box template has a template floor 74 with openings 78 through which the connection body 60 projects when installed. The openings 78 can have seals in order to ensure a maximally fluid-tight transition between the connection body 60 and the template floor 74.

Furthermore, the template floor 74 has at least one snap-in element 76 (two snap-in elements, in the exemplary embodiment shown) by means of which the box template 70 can be attached to the connection body 60. The shape of the template floor 74 can be adapted to the surface of the faces of the connection body against which it comes to rest in order to ensure the most stable possible arrangement. Furthermore, the box template can have orientation markings 75 on the exterior side of the template wall 72 for facilitating height adjustment.

During installation of the assembly unit, along with the connection body attached to it, the box template 70 can be removed in order, for example, to mark the area to be cut out of a drywall sheet. To do so, the box template 70 is snapped out of the connection body and the upper edge 71 of the template opposite the floor 74 of the template is placed against the drywall sheet; then a pencil is used to trace the upper edge 71 on the wall, thereby marking the area to be cut out. Next, the box template 70 is snapped back onto the connection body. The box template is useful also during plastering, since the plaster can be applied to the unfinished wall around the box template, thereby always ensuring sufficient access to the connection body.

Once the wall surface is finished, the portion of the box template that extends beyond the wall surface is removed. To do this, the outer side of the template wall 72 is marked along the wall surface—again, using a pencil, for example—then removed and separated along the marking (e.g. by sawing or cutting) before being placed again into the masonry wall opening and onto the connection body. By cutting off the box template in this flush manner, it serves as a cutting edge for the tile contact along which the grouting can then be applied. The box template therefore performs a double marking function.

FIG. 5 shows another version of a fastening element 14" for use in a masonry wall, similar to the fastening element of FIGS. 3 and 4. However, with the difference that the fastening element 14" is designed as a single, ring-shaped element. Specifically, the fastening element 14" comprises at least one first lower section 16" (four sections 16" in the exemplary embodiment shown) which terminate in a single upper section 18" having attachment holes 19". The upper second section 18" extends in a basically annular shape around the connection body 60, as is also evident from the illustration in FIG. 6 (the version of the fastening element 14" shown there comprises only two lower sections 16"). For increased flexibility, the lower sections 16" have two slots 20" positioned one above the other. The ring-shaped design of the fastening element is associated with increased stability and simpler installation.

I claim:

1. Assembly unit for a concealed plumbing fixture, comprising:
   a) an assembly plate;
   b) first and second fastening elements for fastening to the assembly plate and an unfinished wall or mounting plane, each of the first and second fastening elements including a first section for detachably and fixedly attaching to the assembly plate and a second section for fastening to the unfinished wall or mounting plane, the first section and the second section forming an L-shape with the first section and the second section forming an angle of essentially 90°;
   c) the assembly plate is configured to be adjustably and fixedly attached to the first section of each of the first and second fastening elements, the assembly plate having opposed first and second longitudinal edge portions to which the first section of each of the first and second fastening elements are adjustably and fixedly attached, respectively;
   d) the assembly plate including a longitudinal length, the assembly plate including first and second longitudinal slots formed along the longitudinal length;
   e) first and second connection devices rotatably and slidably attached to the respective first and second longitudinal slots;
   f) the connection devices have acoustic decoupling means; and
   g) the connection devices are configured as pipe clamps for supporting the plumbing fixture.

2. Assembly unit according to claim 1, wherein the second section of each of the first and second fastening elements has at least one through-hole for fastening the respective first and second fastening elements to the unfinished wall or mounting plane.

3. Assembly unit according to claim 1, wherein the first section of each of the first and second fastening elements has a slot for receiving a connection element for attaching thereto the assembly plate.

4. Assembly unit according to claim 3, wherein the assembly plate has first and second lateral receiving elements on the first and second longitudinal edge portions, respectively, for receiving the respective connection element.

5. Assembly unit according to claim 4, wherein each of the first and second lateral receiving elements has a receiving hole for receiving the respective connection element.

6. Assembly unit according to claim 1, wherein the acoustic decoupling means is configured as a soundproofing insert placed within the respective pipe clamps.

7. Assembly unit according to claim 1, wherein the acoustic decoupling means is made of ethylene propylene diene monomer (EPDM).

8. Assembly unit for a concealed plumbing fixture, comprising:
   a) an assembly plate;
   b) first and second fastening elements for fastening to the assembly plate and an unfinished wall or mounting plane, each of the first and second fastening elements including a first section for detachably and fixedly attaching to the assembly plate and a second section for fastening to the unfinished wall or mounting plane, the first section and the second section forming an L-shape with the first section and the second section forming an angle of essentially 90°;
   c) the assembly plate is configured to be adjustably and fixedly attached to the first section of each of the first and second fastening elements, the assembly plate having opposed first and second longitudinal edge portions to which the first section of each of the first and second fastening elements are adjustably and fixedly attached, respectively;
   d) the assembly plate including a longitudinal length, the assembly plate including first and second longitudinal slots formed along the longitudinal length;
   e) first and second connection devices for supporting the plumbing fixture, wherein the first and second connection are rotatably and slidably attached to the respective first and second longitudinal slots; and
   f) a box template box template having a circumferential wall and a floor, wherein the box template comprises a snap-in element for detachably connectable to a connection body of the plumbing fixture.

9. Assembly unit according to claim 8, wherein the connection devices have acoustic decoupling means.

10. Assembly unit according to claim 9, wherein the connection devices are configured as pipe clamps.

11. Assembly unit according to claim 10, wherein the acoustic decoupling means is configured as a soundproofing insert placed within the respective pipe clamps.

12. Assembly unit according to claim 9, wherein the acoustic decoupling means is made of ethylene propylene diene monomer (EPDM).

13. Assembly unit according to claim 1, wherein the connection devices are made of steel or electrogalvanized steel.

* * * * *